United States Patent
Kozempel (10) Patent No.: US 8,938,436 B2
(45) Date of Patent: Jan. 20, 2015

(54) SYSTEM FOR AND METHOD OF PROVIDING REUSABLE SOFTWARE SERVICE INFORMATION BASED ON NATURAL LANGUAGE QUERIES

(75) Inventor: Thomas Kozempel, Sewell, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 12/776,611

(22) Filed: May 10, 2010

(65) Prior Publication Data

US 2011/0276598 A1   Nov. 10, 2011

(51) Int. Cl.
*G06F 17/30* (2006.01)

(52) U.S. Cl.
CPC .............................. *G06F 17/30684* (2013.01)
USPC ..... 707/706; 707/708; 707/723; 707/E17.015

(58) Field of Classification Search
CPC ............. G06F 17/30; G06F 17/30401; G06F 17/3043; G06F 17/30654; G06F 17/3066; G06F 17/30976
USPC ........ 707/706, 708, 758, 759, 769, 770, 771, 707/E17.014, E17.015, E17.032, E17.068, 707/E17.078, E17.139, 999.003, 999.004, 707/723

See application file for complete search history.

(56) References Cited

U.S. PATENT DOCUMENTS

| | | | |
|---|---|---|---|
| 2003/0014399 A1* | 1/2003 | Hansen et al. | 707/3 |
| 2005/0028104 A1* | 2/2005 | Apparao et al. | 715/738 |
| 2005/0050042 A1* | 3/2005 | Elder | 707/4 |
| 2008/0082569 A1* | 4/2008 | Mansour et al. | 707/102 |
| 2008/0189261 A1* | 8/2008 | Andreev et al. | 707/5 |
| 2008/0244518 A1* | 10/2008 | Kozempel et al. | 717/120 |
| 2009/0210870 A1* | 8/2009 | Clark et al. | 717/178 |
| 2010/0269099 A1* | 10/2010 | Yoshimura et al. | 717/122 |

* cited by examiner

*Primary Examiner* — Ajay Bhatia
*Assistant Examiner* — Miranda Huang (57) ABSTRACT

A system for and method of providing reusable software service information based on natural language queries. The system and method may include receiving, from a user system, query data in a natural language format that indicates a request for a plurality of reusable software service applications that are configured to perform a particular task, processing the query data to generate search criteria that include query values, and searching, a database, for the plurality of reusable software service applications based on the query values.

18 Claims, 5 Drawing Sheets

Enter A Business Objective Statement:
(*e.g.*, Order FIOS TV service, Get GPS service) — 300

FIND ASSOCIATED BUSINESS SERVICES — 302

Fig. 3A

Enter Your Action Request Statement Below:
(*e.g.*, Rent a video, Download a book) — 304

SUBMIT MY REQUEST — 306

Fig. 3B

Enter One Or More Keywords Below:
(*e.g.*, GPS, Circuit, FIOS, Loop, Fax, Profile) — 308

SUBMIT KEYWORD DISCOVERY REQUEST — 310

Fig. 3C

| Item | Service Name | Interface Type | Version | Environment | Owner | Application Name | Description | Sub Type | Reuse Profile |
|---|---|---|---|---|---|---|---|---|---|
| 1 | ShowMyTroubleTickets | WebService | 1.0 | Production | BigCo Telco | Service Mgmt | This service provides a list of all trouble reports for a given entity. | Both | High |
| 2 | SubmitTicket | WebService | 2.0 | Production | ThatCo Wireless | Business Service Assurance | This service accepts new requests to submit a trouble ticket from a business customer portal or application. | Int | Med |
| 3 | PayMyTicket | WebService | 1.5 | Production | ExpInvoice Gateway | Bill Payment | This service accepts and processes a payment for a parking ticket or any other motor vehicle violation fee. | Int | High |
| 4 | GetShowTickets | WebService | 3.2 | Production | Ticketing Unit | Ticket Broker | A suite of shared APIs for ticketing agents. Check to see if seats are available for this particular venue and show and reserves tickets. | Ext | Very High |
| 5 | EstablishNewTicket | WebService | 3.2 | Production | IT Support Helpdesk | Workforce Internal Ticket | This service creates a new helpdesk trouble ticket for assignment and resolution by IT support – centrally or in the field. | Int | Low |
| 6 | BookFlight | WebService | 1.5 | Production | LowCost Airlines | ABC Airlines | After review of all available flights and prices from all carriers, this service is used to arrange the individual airline reservations | Int | Med |

Click any service name above to see more details about Operations Provided, Business Taxonomy, Support Contacts, Metrics, Usage Profile, and Test Access Click Below To Link To The Service Management Portal And Arrange A Subscription To One Or More Of These Services

CLICK TO REGISTER

SYSTEM FOR AND METHOD OF PROVIDING REUSABLE SOFTWARE SERVICE INFORMATION BASED ON NATURAL LANGUAGE QUERIES

BACKGROUND INFORMATION

In general, various departments of a business organization may spend a substantial amount of resources developing custom software applications that are designed to perform particular tasks. In many cases, a software application designed to perform a particular task (e.g., get credit history of a customer) may be separately developed by each department (e.g., a Sales department, a Customer Service department) of the business organization. Such redundancy in software design and development, however, may unnecessarily increase the business organization's operating costs.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 4 is a table of exemplary service information associated with software service applications according to a particular embodiment.

DETAILED DESCRIPTION OF PREFERRED EMBODIMENTS

Software service applications (e.g., software applications) may be developed by many organizations (e.g., business organizations, educational institutions, government entities, private individuals) to perform particular tasks (e.g., business processes, functions). Oftentimes, a software service application designed to perform the same task may be developed by several different organizations. Such software service application development redundancy limits the efficient operation of these organizations.

Developers (e.g., software developers, business analysts, searchers) associated with various organizations may interact with a software development environment to design and develop software to meet a business goal, meet a business objective, perform a business process, or perform a function. Instead of developing custom software service applications, these developers may access a centralized reusable software system through an application (e.g., reusable software directory widget) that is coupled to the software development environment to search for registered software service applications that perform at least a portion of the business process or function. For example, a business analyst employed by Company A may access the reusable software system through a reusable software directory widget that is coupled to a software development environment to search for software service applications associated with accessing a customer's credit history. In another example, a software developer employed by Company B may access the reusable software system through a graphical user interface feature of a main service management portal to search for software service applications associated with advertising a product.

Reusable software service applications may include software that is not specific to a vendor, architecture, or product. Accordingly, these developers may access reusable software service applications that are non-proprietary.

These developers may input query data in a natural language format into the reusable software system. Based on the query, the reusable software system may search for and return service information associated with one or more relevant software service applications.

A reusable software system may store service information associated with hundreds and thousands of software service applications that have been pre-registered in a reusable software service application registry (e.g., a central registry database). Service information may include data that indicates one or more characteristics of a software service application. For example, service information may include any, or a combination, of business related information (e.g., taxonomy values), service name information (e.g., a name of a service performed by a software service application), interface type information (e.g., a type of interface used to access a software service application), version release information (e.g., a version of a software service application), environment information (e.g., area of business organization associated with a software service application), owner information (e.g., developer/register of software service application), application name information (e.g., a name of a software service application), description information (e.g., a description of a software service application), subscriber type information (e.g., a type of subscriber to a software service application), and reuse profile information (e.g., an amount of reuse of a software service application). The reusable software system may search for and return software service information associated with multiple software service applications registered in the reusable software service application registry in response to a query from a user system (e.g., desk top computer, lap top computer) operated by a registered user or a non-registered user.

In one embodiment, the reusable software system may be configured to receive a query in a natural language format. A natural language format may include any format that presents data in a human-language form. Accordingly, the reusable software system may be user-friendly. For example, the reusable software system may be configured to receive a query in a natural language format and search against one or more taxonomy values associated with a pre-defined taxonomy. Such taxonomy values may include those described in U.S. patent application Ser. No. 11/693,204 entitled "Telecom Business-Oriented Taxonomy For Reusable Services," filed on Mar. 29, 2007, which is incorporated by reference herein in its entirety.

In another embodiment, the reusable software system may be configured to receive a query in a standard query format.

The reusable software system may be configured to transmit a result set that includes service information associated with software service applications returned in response to a query to any type of user (e.g., a registered user, a non-registered user, a user with access to a private network, a user with access to a public network). For example, the reusable software system may transmit a result set to a user system of an employee of a company via a private network in a private usage scenario. In another example, the reusable software system may transmit a result set to a user system of a user accessing the reusable software system via a public network (e.g., the Internet) in a public usage scenario.

The reusable software system may be configured to authorize and arrange registered users to access (e.g., download, execute) an instance of a software service application returned in a result set. A registered user may include a user that has registered with the reusable software system during a registration stage to initiate access to instances of software service applications registered to the reusable software service application registry. During a registration stage, a user may register with the reusable software system by inputting registration data using a user system. In one embodiment, registration data may include any, or a combination, of a username, a user password, an address, an email address, and credit card information.

The natural language query used in conjunction with the reusable software system may enhance and extend to organizations the following benefits. First, using the natural language query in conjunction with the reusable software system may significantly increase the productivity of information technology personnel and business analysts. Second, using the natural language query in conjunction with the reusable software system may significantly increase the speed-to-market for new products and related integration. Third, using the natural language query in conjunction with the reusable software system may enable rapid software development since reusable software service applications may be used (instead of fully developing software applications in-house). Fourth, using the natural language query in conjunction with the reusable software system may significantly increase revenue based on the fees charged and collected for use of registered software service applications.

The following features of the reusable software system may increase an organization's productivity. First, the reusable software system may leverage pre-determined taxonomy and business-oriented values. Second, the reusable software system may support natural language queries such that a searcher does not have to be familiar with the technical aspects of searching a registry for reusable software to receive meaningful results from the reusable software system. Third, the reusable software system may pre-process each natural language query to ensure that a search request is optimized to return meaningful results. Finally, the reusable software system may return some default results (e.g., the top ten requested software service applications) in the event a search query fails to return results.

Figure 1:
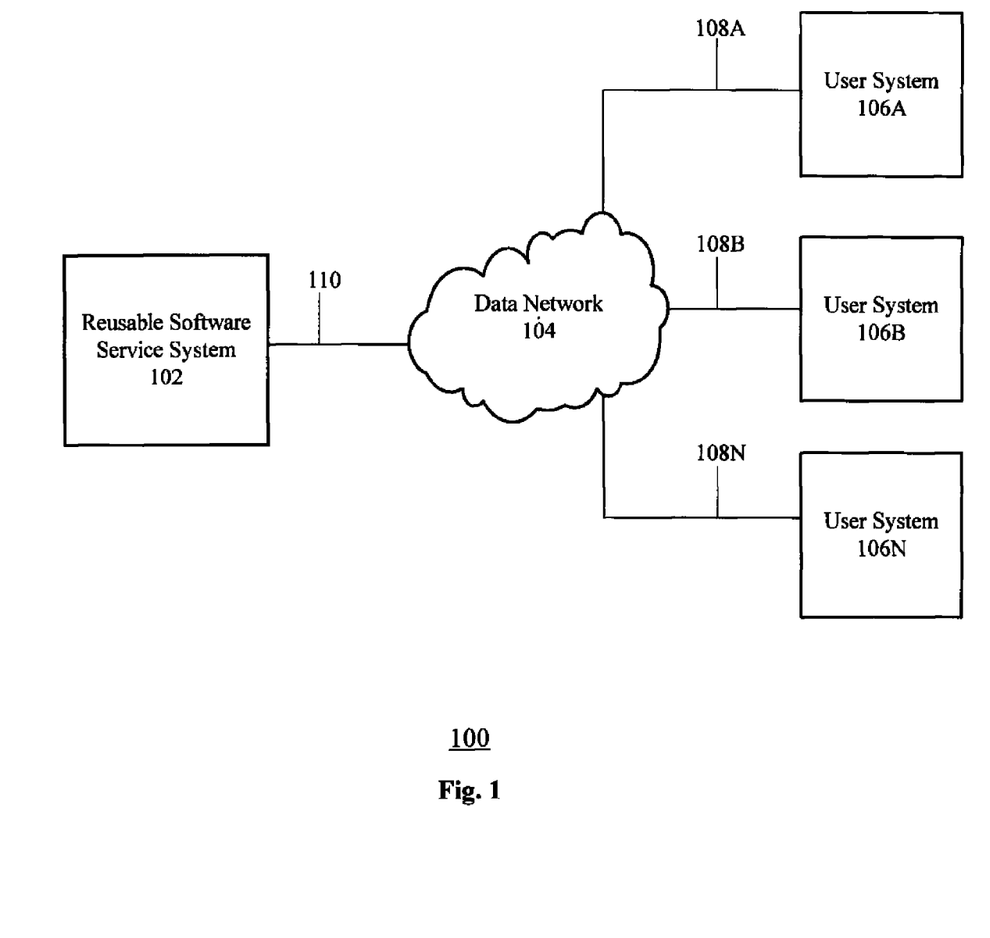
FIG. 1 is a schematic diagram illustrating a reusable software system according to a particular embodiment.

FIG. 1 is a schematic diagram illustrating a reusable software system according to a particular embodiment. A reusable software system 100 may communicatively couple together any, or a combination, of a reusable software service system 102 and user systems 106A, 106B, 106N, using any, or a combination, of data network 104 and data paths 108A, 108B, 108N, 110. Accordingly, data signals may be transmitted to any of the components of the reusable software system 100 and transmitted from any of the components of the reusable software system 100 using any, or a combination, of data network 104 and data paths 108A, 108B, 108N, 110. For example, query data signals, service information data signals, registration data signals, or any other data signals may be transmitted to any of the components of the reusable software system 100 and transmitted from any of the components of the reusable software system 100 using any, or a combination, of data network 104 and data paths 108A, 108B, 108N, 110.

Data network 104 may be a wireless network, a wired network, or any combination of wireless network and wired network. For example, data network 104 may include one or more of a fiber optics network, a passive optical network, a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, data network 104 may include, without limitation, a telephone line, fiber optics, IEEE Ethernet 802.3, a wide area network (WAN), a LAN, or a global network, such as the Internet. Also, data network 104 may support, an Internet network, a wireless communication network, a cellular network, or the like, or any combination thereof. Data network 104 may further include one, or any number of the exemplary types of networks mentioned above operating as a stand-alone network or in cooperation with each other. Data network 104 may utilize one or more protocols of one or more network elements to which it is communicatively coupled. Data network 104 may translate to or from other protocols to one or more protocols of network devices. Although data network 104 is depicted as one network, it should be appreciated that according to one or more embodiments, data network 104 may comprise a plurality of interconnected networks, such as, for example, a service provider network, the Internet, a broadcaster's network, a cable television network, corporate networks, and home networks.

Reusable software service system 102 and user systems 106A, 106B, 106N may transmit data to and receive data from data network 104 representing query data, service information data, registration data, and other data. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. Data network 104 may use standard wireless protocols including IEEE 802.11a, 802.11b and 802.11g. Data network 104 may also use protocols for a wired connection, such as an IEEE Ethernet 802.3.

User systems 106A, 106B, 106N may be communicatively coupled to data network 104 via data paths 108A, 108B, 108N, respectively. The user systems 106A, 106B, 106N may include, but are not limited to, computer devices or communications devices including, e.g., a personal computer (PC), a workstation, a PDA, a mobile device, a handheld PC, a thin system, a fat system, a network appliance, a lap top device, a set top box, a VoIP device, a client system, an end-user system, or any other device that is configured to transmit query data, registration data and receive service information data.

Reusable software service system 102 may be communicatively coupled to data network 104 via data path 110. The reusable software service system 102 may include, but is not limited to, a computer device or communications device including, e.g., a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to receive query data associated with a request for service information associated with software service applications, process the query data to generate query values, search for and return software service applications based on the query values, output service information associated with the returned software service applications, transmit the service information to a user system, register a user of a user system (e.g., by supplying a password and user name), and authorize and arrange a registered user to access an instance of a software service application. Details of the reusable software service system 102 and the reusable software system 100 are provided below.

Data paths disclosed herein may include any device that communicatively couples one or more devices to each other. For example, data paths may include one or more networks (e.g., a wireless network, a LAN) or one or more conductive wires (e.g., copper wires).

Figure 2:
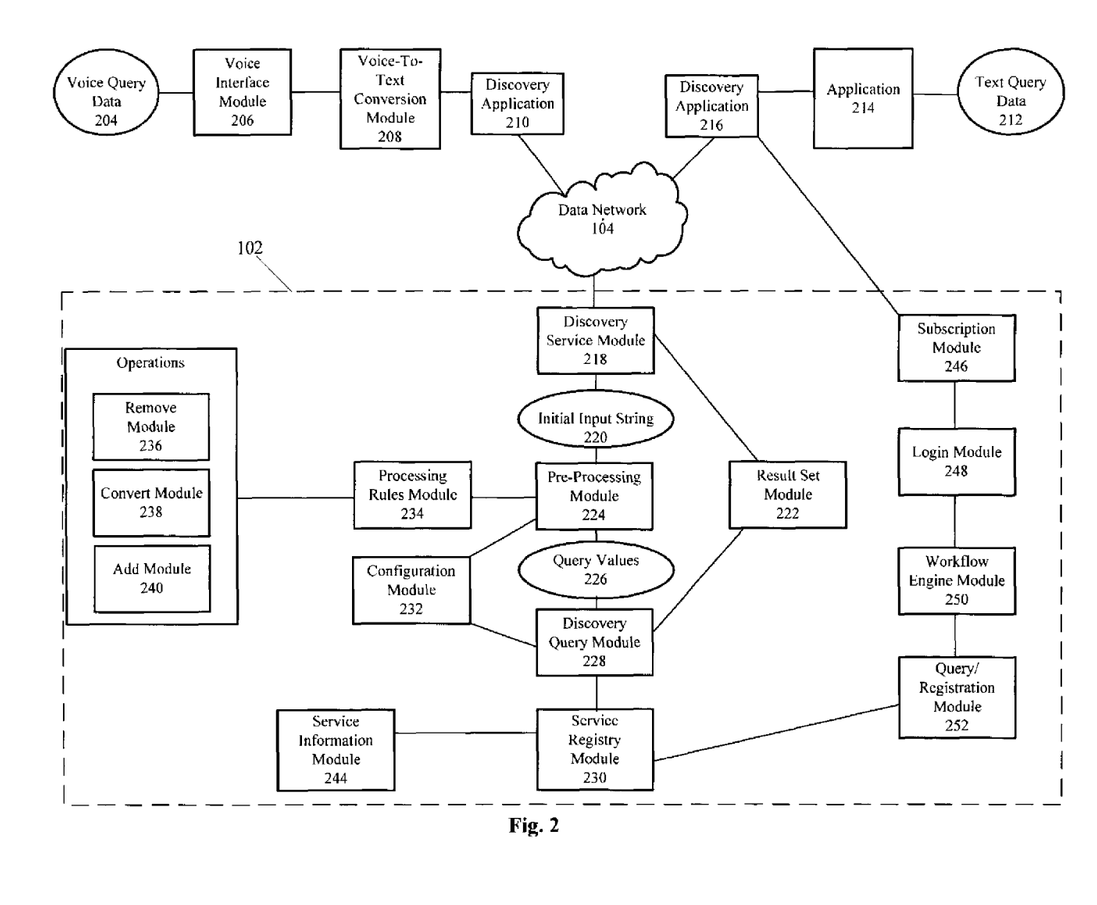
FIG. 2 is a schematic diagram of hardware components of a reusable software system of a particular embodiment.

FIG. 2 is a schematic diagram of hardware components of a reusable software system of a particular embodiment. The reusable software system 100 may include a voice interface module 206, a voice-to-text conversion module 208, discovery applications 210, 216, an application 214, and a reusable software service system 102. The reusable software service system 102 may include a discovery service module 218, a pre-processing module 224, a processing rules module 234, a remove module 236, a convert module 238, an add module 240, a discovery query module 228, a service registry module 230, a service information module 244, a result set module 222, a configuration module 232, a subscription module 246, a login module 248, a workflow engine module 250, and a query/registration module 252. It is noted that the modules 206, 208, 218, 224, 234, 236, 238, 240, 228, 230, 244, 222, 232, 246, 248, 250, and 252 are exemplary. The functions of the modules 206, 208, 218, 224, 234, 236, 238, 240, 228, 230, 244, 222, 232, 246, 248, 250, and 252, may be performed at other modules remote or local to the reusable software system 100 or the reusable software service system 102, and the modules 206, 208, 218, 224, 234, 236, 238, 240, 228, 230, 244, 222, 232, 246, 248, 250, and 252 may be combined or separated.

The voice interface module 206 may include computer-implemented software, hardware, or a combination of both, configured to receive voice query data 204. The voice query data 204 may include a voice recording of a request for service information associated with one or more registered software service applications (e.g., a software service application registered to a reusable software service application registry). In one embodiment, the voice query data 204 may include a voice recorded response to a question (e.g., "What is your business goal?", "What would you like to accomplish?"). The voice interface module 206 may be configured to transmit the voice query data 204 to the voice-to-text conversion module 208.

The voice-to-text conversion module 208 may include computer-implemented software, hardware, or a combination of both, configured to receive and covert the voice query data 204 to text query data. The voice-to-text conversion module 208 may include any voice recognition software configured to convert voice query data to text query data. The voice-to-text conversion module 208 may be configured to transmit the text query data to the reusable software service system 102 via the discovery application 210, the data network 104, or a combination of both.

An application 214 (e.g., a web application, a web browser) may be configured to receive text query data 212. For example, the application 214 may be configured to receive text query data inputted into one or more web pages (e.g., the web pages illustrated in FIG. 3A, FIG. 3B, FIG. 3C). In one embodiment, the text query data 212 may include text query data in a natural language format. For example, the text query data 212 may include a text response to a question (e.g., "What is your business goal?", "What would you like to accomplish?"). The application 214 may be configured to transmit the text query data 212 to the reusable software service system 102 via the discovery application 216, the data network 104, or a combination of both.

It should be noted that the voice interface module 206, the voice-to-text conversion module 208, the discovery applications 210, 216, and the application 214 may be configured to operate on or with one or more user systems (e.g., user systems 106A, 106B, 106N). Accordingly, the user systems may be configured to transmit query data (e.g., text query data) to the reusable software service system 102 via the discovery applications 210, 216, the data network 104, or a combination of both.

The discovery service module 218 of the reusable software service system 102 may include computer-implemented software, hardware, or a combination of both, configured to receive the query data from the data network 104. In one embodiment, the discovery service module 218 may receive query data that includes requests for service information associated with software service applications in natural language format (e.g., free-form text). For example, received query data may include "I want to send a fax." In another example, received query data may include "What can I use to submit Work Orders." In yet another example, received query data may include "I need to check a customer's credit history."

In another embodiment, the discovery service module 218 may receive query data that includes requests for service information associated with software service applications in the form of one or more keywords associated with a service or software service application. For example, received query data may include a "GPS" keyword to request service information associated with software service applications that perform global-positioning-system-related tasks. In another example, received query data may include a "fax" keyword and an "email" keyword to request service information associated with software service applications that perform tasks related to sending and receiving faxes via an email account. The discovery service module 218 may transmit the received query data as an initial input string 220 to the pre-processing module 224.

The pre-processing module 224 may include computer-implemented software, hardware, or a combination of both, configured to receive the initial input string 220 and initiate the processing of the initial input string 220 to generate one or more query values. The pre-processing module 224 may initiate the processing of the initial input string 220 by transmitting the initial input string 220 to the processing rules module 234.

The processing rules module 234 may include computer-implemented software, hardware, or a combination of both, configured to store one or more types of processing rules. For example, the processing rules module 234 may store one or more removal processing rules, one or more conversion processing rules, and one or more addition processing rules. A removal processing rule may indicate a character or a space to be removed from an initial input string (e.g., initial input string 220) during processing. A conversion processing rule may indicate a group of one or more characters of an initial input string (e.g., initial input string 220) to be converted to another group of one or more characters during processing. An addition processing rule may indicate a word to be added to an initial input string (e.g., initial input string 220) during processing. The processing rules module 234 may be configured to transmit an initial input string to any, or a combination, of a removal module 236, a convert module 238, and an add module 240 for processing (e.g., the application of one or more processing rules to the initial input string).

The removal module 236 may include computer-implemented software, hardware, or a combination of both, configured to apply one or more removal processing rules to an initial input string (e.g., initial input string 220). A first removal processing rule may remove single characters (e.g., 1, a, I) from the initial input string. A second removal processing rule may remove extra white space from the initial input string. A third removal processing rule may remove special characters and punctuation (e.g., :, }, &, *, !, ?, ., @) from the initial input string. A fourth removal processing rule may remove numbers (e.g., 99, 10, 34, 443300) from the initial input string. A fifth removal processing rule may remove noise words and phrases (e.g., "Please . . . ", "I want to . . . ", "Help me . . . ") from the initial input string. A sixth removal processing rule may remove prepositions and pre-designated unimportant words (e.g., "is", "the", "are", "be", "if", "do", "of", "for", "and", "to", "can") from the initial input string. A seventh removal processing rule may remove pre-designated reserved words (e.g., "service", "management", "record", "field", "element", "attribute") from the initial input string. The removal module 236 may be configured to apply the above removal processing rules or any other removal processing rules to an initial input string (e.g., initial input string 220) in accordance with design preferences.

The convert module 238 may include computer-implemented software, hardware, or a combination of both, configured to apply one or more conversion processing rules to an initial input string (e.g., initial input string 220). A first conversion processing rule may convert plural-form-words of the initial input string to singular-form-words. A second conversion processing rule may convert upper case letters in the initial input string to lower case letters. A third conversion processing rule may convert pre-designated common words (e.g., "game", "music", "video") in the initial input string to domain specific words (e.g., "content", "multimedia"). The convert module 238 may be configured to apply the above conversion processing rules or any other conversion processing rules to an initial input string (e.g., initial input string 220) in accordance with design preferences.

The add module 240 may include computer-implemented software, hardware, or a combination of both, configured to apply one or more addition processing rules to an initial input string (e.g., initial input string 220). A first addition processing rule may add noun synonyms (e.g., addition of "content" as a synonym for "video") to the initial input string. A second addition processing rule may add verb synonyms (e.g., addition of "get" as a synonym for "retrieve") to the initial input string. The add module 240 may be configured to apply the above addition processing rules or any other addition processing rules to an initial input string (e.g., initial input string 220) in accordance with design preferences.

In one embodiment, the application of an addition processing rule to an initial input string may generate an additional set of query values (e.g., key words). For example, the add module 240 may apply an addition processing rule to an initial input string that includes "get credit history." The result of the application of the addition processing rule may include the addition of the noun synonym "credit report." As a result, two sets of query values may be generated: (1) "get, credit history"; and (2) "get, credit report." Accordingly, the application of an addition processing rule may generate a set of query values for each word added.

By way of non-limiting example, the pre-processing module 224 may receive an initial input string that includes "I need to retrieve the credit history for my customers." The pre-processing module 224 may transmit the initial input string to the processing rules module 234 to initiate the processing of the initial input string to generate one or more query values. After the remove module 236 applies one or more removal processing rules, a semi-processed initial input string may include "retrieve, credit history, customers." After the convert module 238 applies one or more conversion processing rules, a further-processed initial input string may include "get credit history customer." After the addition module 238 applies one or more addition processing rules, a further-processed initial input string may include "get, credit history, credit report, customer." Accordingly, a first set of query values "get, credit history, customer" and a second set of query values "get, credit report, customer" may be generated from the processing of the initial input string (e.g., "I need to retrieve the credit history for my customers"). The query values may include one or more sets of keywords that are submitted as one or more queries to the service registry module 230 (e.g., a reusable software service application registry).

After the processing of an initial input string (e.g., initial input string 220) is complete, pre-processing module 234 may transmit one or more query values (e.g., query values 226) to the discovery query module 228 as input parameters to a discovery process (a searching process). Each query value (keyword in a set) may be positioned as an input parameter (e.g., keyword 1, keyword 2, keyword 3) in a set.

The discovery query module 228 may include computer-implemented software, hardware, or a combination of both, configured to receive query values 226 as input parameters to the discovery process (a searching process). The discovery query module 228 may search the service registry module 230 or initiate a search in the service registry module 230 for software service applications associated with the query values. Wildcard text matching may be used to query values to words within larger words (e.g., to find "bit" in "ambition", to find "voip" in "RetrieveVOIPCustomerName").

The service registry module 230 may include computer-implemented software, hardware, or a combination of both, configured to store or search registered (e.g., published) software service applications based on the inputted query values. The service registry module 230 may include or have access to one or more registries, one or more sub-registries, one or more service information databases (e.g., service information databases accessible via the service information module 244), or one or more federated registries. The service registry module 230 may use the query values to locate matches in any, or a combination, of taxonomy values (e.g., telecom-oriented business taxonomy values), a web service definition language (WSDL) file field, an interface definition document field, a service name information field, a description information field, a key words field, or any other information associated with the software service applications. Accordingly, the query values may be used to locate matches in metadata associated with one or more registered software service applications.

The discovery query module 228 may return a result set of service information associated with one or more software service applications to a user operating a user system (e.g., user systems 106A, 106B, 106N) via the result set module 222. The result set module 222 may return the result set in an Extensible Markup Language (XML) format (or a HyperText Markup Language (e.g., HTML) format for cell phone user systems or other user systems) for display as a list on a screen of a user system, a payload transmitted to a remote application procedure operating on a user system, or a list sent via electronic mail. One or more links may be embedded in the result set such that activation of the link may initiate a subscription process or registration process. A user that completes the subscription process or registration process may be allowed to view additional details of a software service application (e.g., service levels, scope of support, usage history, ownership, costs, necessary arrangements for usage) and arrange a subscription to use the software service application (e.g., an instance of the software service application).

The configuration module 232 may include computer-implemented software, hardware, or a combination of both, configured to store one or more pre-defined configuration variables associated with the reusable software service system 102. For example, a pre-defined configuration variable may pre-set searches to be directed to a particular registry (e.g., a business unit, an industry area). In another example, a pre-defined configuration variable may be defined to return results from certain types of software service applications (e.g., production software service applications, testing software service applications, development software service applications). In yet another example, a pre-defined configuration variable may be defined to return results that are the latest version.

The configuration module 232 may be configured to configure one or more parameters associated with front-end interfaces (e.g., use a voice interface module for a cell phone front-end (user system)). The configuration module 232 may also be configured to configure or define one or more processing rules. The configuration module 232 may be configured to configure or define default results that are included in a result set.

The subscription module 246 may include computer-implemented software, hardware, or a combination of both, configured to allow a user to subscribe to view additional details associated with a particular registered software service application in response to activation of a link in the result set associated with the particular registered software service application. For example, the subscription module 246 may be configured to allow a user to input subscription data (e.g., a first name, last name, address).

The login module 248 may include computer-implemented software, hardware, or a combination of both, configured to allow a user to login to access the additional details associated with a particular registered software service application. For example, the login module 248 may be configured to allow a user to input any, or a combination, of a username, password, address, email address, and credit card information.

The workflow engine module 250 may include computer-implemented software, hardware, or a combination of both, configured to allow a user to access the details of a particular registered software service application or input an additional query for service information associated with one or more registered software service applications. In one embodiment, the workflow engine module 250 may be configured to arrange a subscribing user's use of a registered software service application. Accordingly, the workflow engine module 250 may be configured to aid in establishing a service level agreement (SLA) between a subscribing user and a provider (e.g., publisher) of a software service application. Accordingly, the workflow engine module 250 may arrange for a subscribing user to become an authorized user of a software service application (e.g., an instance of a software service application) registered by a provider.

The query/registration module 252 may include computer-implemented software, hardware, or a combination of both, configured to authenticate a registered user, search for additional service information, and provide access to details associated with a particular registered software service application.

Figure 3A:
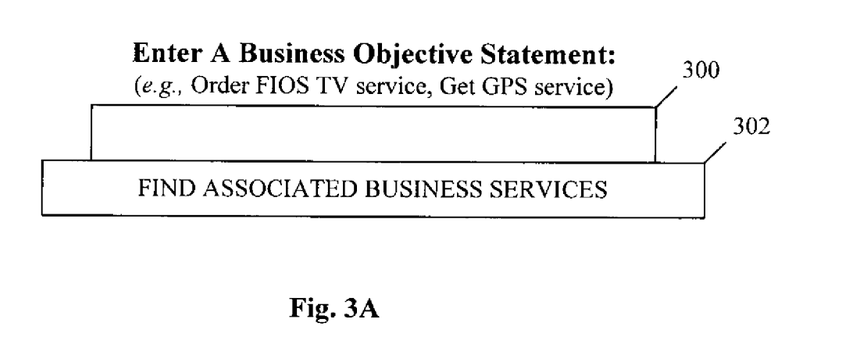
FIG. 3A illustrates an exemplary screen for inputting query data in a natural language format according to a particular embodiment.

FIG. 3A illustrates an exemplary screen for inputting query data in a natural language format according to a particular embodiment. As illustrated in FIG. 3A, a user may be allowed to input query data in a natural language format. In one embodiment, a user may input query data by entering a business objective statement into an input field 300 using an input device (e.g., a keyboard). For example, a user may input "Order FiOS TV" as a business objective statement or "Get GPS Service" as a business objective statement. After a business objective statement has been entered into the input field 300, the user may activate a "Find Associated Business Services" button 302 using an input device (e.g., a mouse). Based on the received query data (e.g., a business objective statement), the reusable software service system 102 may output a result set that includes one or more registered software service applications associated with the query data.

Figure 3B:
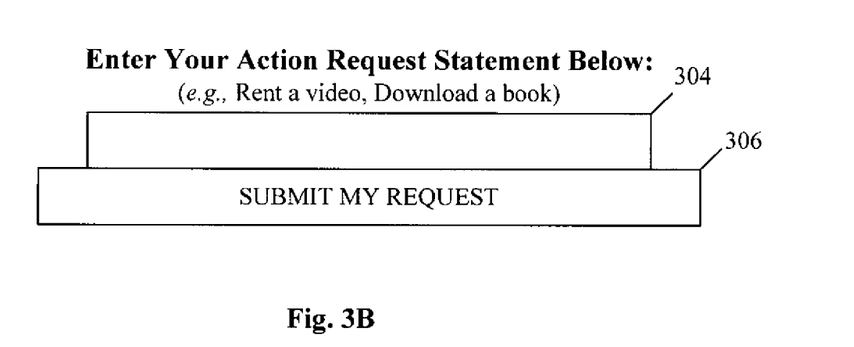
FIG. 3B illustrates another exemplary screen for inputting query data in a natural language format according to a particular embodiment.

FIG. 3B illustrates another exemplary screen for inputting query data in a natural language format according to a particular embodiment. As illustrated in FIG. 3B, a user may be allowed to input query data in a natural language format. In one embodiment, a user may input query data by entering an action request statement into an input field 304 using an input device (e.g., a keyboard). For example, a user may input "Rent a video" as an action request statement or "Download a book" as an action request statement. After an action request statement has been entered into the input field 304, the user may activate a "Submit My Request" button 306 using an input device (e.g., a mouse). Based on the received query data (e.g., an action request statement), the reusable software service system 102 may output a result set that includes one or more registered software service applications associated with the query data.

Figure 3C:
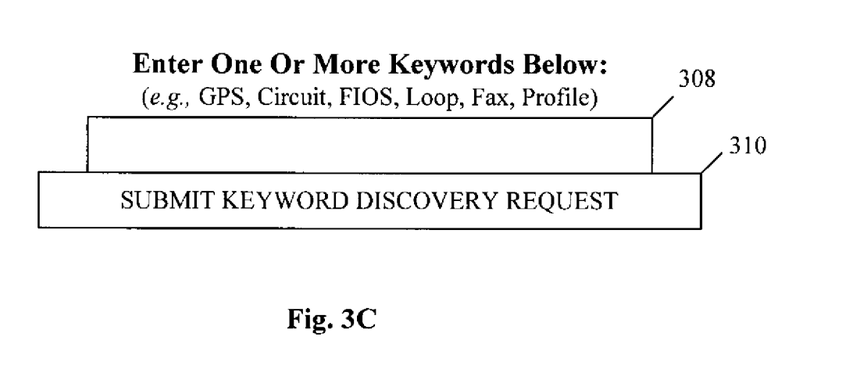
FIG. 3C illustrates another exemplary screen for inputting query data according to a particular embodiment.

FIG. 3C illustrates another exemplary screen for inputting query data according to a particular embodiment. As illustrated in FIG. 3C, a user may be allowed to input query data in a natural language format. In one embodiment, a user may input query data by entering one or more keywords into an input field 308 using an input device (e.g., a keyboard). For example, a user may input "GPS" as a keyword, "Circuit" as keyword, "FiOS" as a keyword, "Loop" as a keyword, "Fax" as a keyword, or "Profile" as a keyword. After one or more keywords have been entered into the input field 308, the user may activate a "Submit Keyword Discovery Request" button 310 using an input device (e.g., a mouse). Based on the received query data (e.g., one or more keywords), the reusable software service system 102 may output a result set that includes one or more registered software service applications associated with the query data.

FIG. 4 is a table of exemplary service information associated with software service applications according to a particular embodiment. As illustrated in FIG. 4, a result set of service information associated with one or more registered software service applications may be provided as output in response to a query. The service information may include any, or a combination, of service name information (e.g., a name of a service performed by a software service application), interface type information (e.g., a type of interface used to access a software service application), version release information (e.g., a version of a software service application), environment information (e.g., area of business organization associated with a software service application), owner information (e.g., developer/register of software service application), application name information (e.g., a name of a software service application), description information (e.g., a description of a software service application), subscriber type information (e.g., a type of subscriber to a software service application), and reuse profile information (e.g., an amount of reuse of a software service application).

A user may be allowed to activate a "Click To Register" button to subscribe to one or more software service applications listed in the result set. Accordingly, the user may be allowed to complete a subscription process and a registration process to obtain more details associated with a particular software service application listed in the result set.

In one embodiment, a result set may automatically include the top 10 (ten) most reused list of software service applications associated with a particular domain or industry. In another embodiment, the top 10 (ten) most reused list of software service applications may be returned in a result set when no other matches were located. In another embodiment, a result set may automatically include the newest software service applications registered (e.g., ten of the newest software service applications) or may be outputted when no other matches were located. In another embodiment, a result set may automatically include the most used software service applications registered (e.g., ten of the most used software service applications) or may be outputted when no other matches were located. The defaults provided in the result set may be configured using the configuration module 232.

Each result set may display additional ownership information or usage information when clicked on or hovered over by a user using an input device (e.g., a mouse). In another embodiment, a user may activate "view more details" option (button) to view (drill-down) additional service information. In some embodiments, the additional service information may be available to a user without the user logging in if the additional information is contained in the results set (e.g., the results set XML object). In other embodiments, the additional service information may not be available to the user unless the user logs in if the additional service information is accessed through an identifier (e.g., product number associated with a record of the software service application) and a link (e.g., a Uniform Resource Locator (URL) link, URL identifier) embedded in the results set (e.g., in a link field).

Figure 5:
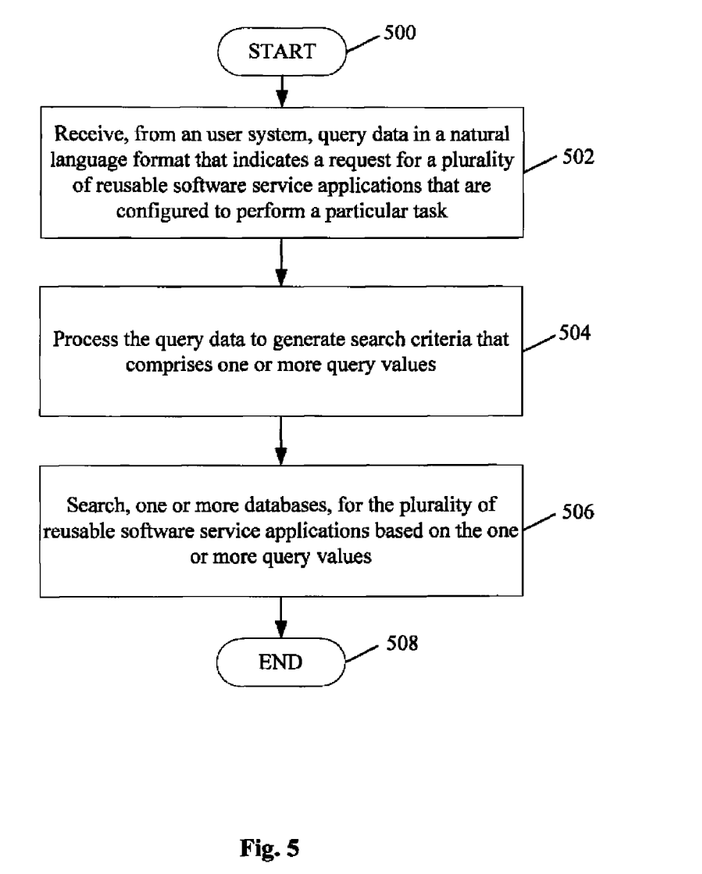
FIG. 5 is a flowchart illustrating the functionality of a particular embodiment.

FIG. 5 is a flowchart illustrating the functionality of a particular embodiment. This exemplary method is provided by way of example, as there are a variety of ways to carry out methods disclosed herein. The method shown in FIG. 5 may be executed or otherwise performed by one or a combination of various systems. The method is described below as carried out by the reusable software service system 102 shown in FIG. 1 by way of example, and various elements of the reusable software service system 102 are referenced in explaining the example method. Each block shown in FIG. 5 represents one or more processes, methods, or subroutines carried out in the exemplary method. Referring to FIG. 5, the exemplary method may begin at block 500.

In block 502, the method may include receiving, from an user system, query data in a natural language format that indicates a request for a plurality of reusable software service applications that are configured to perform a particular task. In one embodiment, the discovery service module 218 of the reusable software service system 102 may receive, from an user system, query data in a natural language format that indicates a request for a plurality of reusable software service applications that are configured to perform a particular task (e.g., business process or function). The method may continue to block 504.

In block 504, the method may include processing the query data to generate search criteria that comprise one or more query values. In one embodiment, the pre-processing module 224 of the reusable software service system 102 may process the query data to generate search criteria that comprise one or more query values. The method may continue to block 506.

In block 506, the method may include searching, one or more databases, for the plurality of reusable software service applications based on the one or more query values. In one embodiment, the discovery query module 228 of the reusable software service system 102 may search, one or more databases (e.g., data stores, data files), to access the plurality of reusable software service applications based on the one or more query values. The method may then end at block 508.

In one embodiment, the reusable software system described herein may be configured to be accessed through an integrated Graphical User Interface (GUI) feature offered by a service management portal. In another embodiment, the reusable software system described herein may be configured to accessed through a stand-alone widget that operates as a GUI element within remote systems. In such embodiments, the widget may be available as a downloadable application that is included in a company tool, device, or application. Further, the widget may be configurable such that it may be used by any application operating on a user system. In another embodiment, the reusable software system described herein may be configured to be accessed through a web service via discovery requests and response message exchanges (e.g., Simple Object Access Protocol (SOAP), HyperText Transfer Protocol).

The description above describes systems and networks that may include one or more modules, some of which are explicitly shown in the figures. As used herein, the term "module" may be understood to refer to any, or a combination, of computer executable computing software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein may be tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
a computer processor; and
a memory comprising computer-readable instructions which when executed by the processor cause the processor to perform the steps comprising:
receiving, from a user system via a network, query data in a natural language format that indicates a request for a plurality of reusable software service applications that are configured to perform a particular task;
transmitting the query data as an initial input string;
processing the initial input string to generate search criteria that comprise query values, wherein processing the initial input string comprises applying conversion processing rules to the initial input string, wherein the conversion processing rules indicate a group of one or more characters of the initial input string to be converted to another group of one or more characters, wherein applying conversion processing rules to the initial input string comprises converting plural form words in the initial input string to singular form words, converting upper case letters in the initial input string to lower case letters, and converting pre-designated common words in the initial input string to domain-specific words;
searching a database for the plurality of reusable software service applications based on the query values; and
outputting a result set that comprises service information associated with the plurality of reusable software service applications and one or more embedded links such that activation of the one or more links initiates one of a registration or subscription process, wherein the result set comprises at least one of a list of software service applications that ranks the applications based on how often each software service application in the list has been reused, a list of software service applications that ranks the applications based on when each software service application in the list was created, and a list of software service applications that ranks the applications based on how often each software service application in the list has been used.

2. The system of claim 1, wherein the query data comprises voice recorded data.

3. The system of claim 1, wherein the step of processing the initial input string further comprises applying removal processing rules to the initial input string.

4. The system of claim 1, wherein the step of processing the initial input string further comprises applying addition processing rules to the initial input string.

5. The system of claim 1, wherein the service information comprises at least one of service name information, interface type information, version release information, environment information, owner information, application name information, description information, subscriber type information, and reuse profile information.

6. The system of claim 1, wherein the result set comprises an Extensible Markup Language (XML) document.

7. A method, comprising:
receiving, from a user system, query data in a natural language format that indicates a request for a plurality of reusable software service applications that are configured to perform a particular task;
transmitting the query data as an initial input string;
processing the initial input string to generate search criteria that comprise query values, wherein processing the initial input string comprises applying conversion processing rules to the initial input string, wherein the conversion processing rules indicate a group of one or more characters of the initial input string to be converted to another group of one or more characters, wherein applying conversion processing rules to the initial input string comprises converting plural form words in the initial input string to singular form words, converting upper case letters in the initial input string to lower case letters, and converting pre-designated common words in the initial input string to domain-specific words;
searching, a database, for the plurality of reusable software service applications based on the query values; and
outputting a result set that comprises service information associated with the plurality of software service applications and one or more embedded links such that activation of the one or more links initiates one of a registration or subscription process, wherein the result set comprises at least one of a list of software service applications that ranks the applications based on how often each software service application in the list has been reused, a list of software service applications that ranks the applications based on when each software service application in the list was created, and a list of software service applications that ranks the applications based on how often each software service application in the list has been used.

8. The method of claim 7, wherein the query data is received via a network.

9. The method of claim 7, wherein the query data comprises voice recorded data.

10. The method of claim 7, wherein processing the initial input string further comprises applying removal processing rules to the initial input string.

11. The method of claim 7, wherein processing the initial input string further comprises applying addition processing rules to the initial input string.

12. The method of claim 7, wherein the service information comprises at least one of service name information, interface type information, version release information, environment information, owner information, application name information, description information, subscriber type information, and reuse profile information.

13. The method of claim 7, wherein the result set comprises an Extensible Markup Language (XML) document.

14. A non-transitory computer readable media comprising code to perform the acts of the method of claim 7.

15. The system of claim 3, wherein applying removal processing rules to the initial input string comprises at least one of removing single characters from the initial input string, removing white space from the initial input string, removing punctuation from the initial input string, removing numbers from the initial input string, removing noise words and phrases from the initial input string, or removing at least one pre-designated word from the initial input string.

16. The system of claim 4, wherein applying addition processing rules to the initial input string comprises at least one of adding noun synonyms to the initial input string, or adding verb synonyms to the initial input string.

17. The system of claim 1, wherein the result set is configured to provide, in response to input from a user, at least one of additional ownership information, additional usage information, and additional service information.

18. The system of claim 1, wherein the query data comprises at least one of a business objective statement, an action request statement, and a keyword.

* * * * *